United States Patent

[11] 3,618,073

[72] Inventors Stephen J. Domchick
Akron;
Howard M. Thomas, Canal Fulton, both of Ohio

[21] Appl. No. 21,567
[22] Filed Mar. 23, 1970
[45] Patented Nov. 2, 1971
[73] Assignee Goodyear Aerospace Corporation
Akron, Ohio

[54] SYNCHRO ANGLE CONVERTER
8 Claims, 6 Drawing Figs.

[52] U.S. Cl. 340/347 SY
[51] Int. Cl. H03k 13/02
[50] Field of Search 340/347

[56] References Cited
UNITED STATES PATENTS

| | | | |
|---|---|---|---|
| 3,504,361 | 3/1970 | Catton | 340/347 |
| 2,980,900 | 4/1961 | Robin | 340/347 |
| 3,295,125 | 12/1966 | Idelsohn | 340/347 |

*Primary Examiner*—Maynard R. Wilbur
*Assistant Examiner*—Jeremiah Glassman
*Attorneys*—J. G. Pere and L. A. Germain

ABSTRACT: A synchro converter demodulates the stator signals, selects stator signal relationships indicative of a rotor-to-stator angular sector through logic switching, converts the selected signals in analog form to digital equivalents, and digitally processes the resultant signals to obtain an output representative of the synchro rotor-to-stator angular position.

INVENTORS
STEPHEN J. DOMCHICK
HOWARD M. THOMAS

BY:
L A Germain
AGENT

INVENTORS
STEPHEN J. DOMCHICK
HOWARD M. THOMAS
BY:
L.A. Germain
AGENT

INVENTORS
STEPHEN J. DOMCHICK
HOWARD M. THOMAS
BY: L.A. Germain
AGENT

SYNCHRO ANGLE CONVERTER

BACKGROUND OF THE INVENTION

This invention generally relates to communication between analog sensors and digital computers and more specifically to a method and apparatus to convert synchro shaft angular position information to a digitized equivalent for computer use.

The apparatus of this invention determines synchro shaft angular position and converts the information to digital form, and to do this efficiently and at speeds compatible with state-of-the-art data acquisition systems, trainers and weapon simulators, and various other systems utilizing synchros, the instant invention combines the advantages of peak sampling demodulation, stator signal selection indicative of rotor-to-stator sector position utilizing state-of-the-art logic circuits, A/D conversion, and digital storage and computation techniques.

SUMMARY OF THE INVENTION

A brief discussion of the conversion theory practiced by this invention will help in the understanding of this invention.

Synchro stator signals are of the amplitude modulated suppressed carrier form having magnitude and phase dependent upon the position of the synchro rotor in relation to the stator. The stator voltage relationships may be written as $^e$S3–S1=NE sin $(wt+\Phi)$ sin $\theta$ $^e$S2–S3=NE sin $(wt+\Phi)$ sin $(\theta+120°)$ $^e$S1–S2=NE sin $(wt+\Phi)$ sin $(\theta+240°)$ where N=turns ratio between stator and rotor winding E=Peak value of rotor excitation voltage (Esinwt)

w=$2\pi$times the rotor excitation frequency $\theta$=angular position of rotor with respect to the stator t=time $\Phi$=phase shift between rotor and stator To determine $\theta$from the above equations, the functions are demodulated i.e., the carrier $\sin(wt+\Phi)$ is separated from the information ($\sin\theta$). Various methods of demodulation may be used, however, only a method of peak sampling will be shown and described because this method does not use filter circuits and therefore, the response time is less and no phase shift errors occur between stator signals in the demodulation process.

The stator signals are sampled simultaneously at their peaks such that $(wt+\Phi)=90°$ and therefore $\sin(wt+\theta)=1$. The above stator signals are reduced to:

$E_{31}$=NE sin $\theta$ $E_{23}$=NE sin $(\theta+120°)$ $E_{12}$=NE sin $(\theta+240°)$ A plot of the demodulated signals on the same coordinates is illustrated in FIG. 1 for a constant speed synchro shaft rotation and shows that the 360° rotation of the synchro shaft may be divided into twelve 30° sectors by monitoring the polarity and magnitudes of the signals with respect to each other. Examination also shows that at 30°, 90°, 150°, 270°, and 330° identical ratios of two of the signals exist. Therefore, a general expression $\theta=K_n\pm\beta$ exists where $K_n$=30°, 90°, 150°, 210°, 270°, and 330°, and $\beta$ is some angle to be defined.

Taking the ratio of the proper stator signals at 30°, 90°, 150°, etc. and substituting $\theta=K_n\pm\beta$ for the appropriate value of $k_n$ yields a general expression for $\beta$:

$$\beta=\tan^{-1}2/\sqrt{3}[V_1/V_2-0.5]$$

where $V_1$ and $v_2$ are the stator signals selected according to the 30° sector monitored. The following table 1 shows the sign of $\beta$, the value of $K_n$ and the stator signals represented by $V_1$ and $V_2$ for each of 12 30° sectors.

| Sector Number | $\theta$ | $V_1$ | $V_2$ | $K_n$ | Sign of $\beta$ |
|---|---|---|---|---|---|
| 1 | 0–30° | $E_{23}$ | $E_{12}$ | 30°th | – |
| 2 | 30–60° | $E_{31}$ | $E_{12}$ | 30° | + |
| 3 | 60–90° | $E_{12}$ | $E_{31}$ | 90° | – |
| 4 | 90–120° | $E_{23}$ | $E_{31}$ | 90° | + |
| 5 | 120–150° | $E_{31}$ | $E_{23}$ | 150° | – |
| 6 | 150–180° | $E_{12}$ | $E_{23}$ | 150° | + |
| 7 | 180–210° | $E_{23}$ | $E_{12}$ | 210° | – |
| 8 | 210–240° | $E_{31}$ | $E_{12}$ | 210° | + |
| 9 | 240–270° | $E_{12}$ | $E_{31}$ | 270° | – |
| 10 | 270–300° | $E_{23}$ | $E_{31}$ | 270° | + |
| 11 | 300–330° | $E_{31}$ | $E_{23}$ | 330° | – |
| 12 | 330–360° | $E_{12}$ | $E_{23}$ | 330° | + |

To determine the value of $\beta$ to be added or subtracted from the value of $K_n$ a series approximation for the arctangent is used.

Since $\beta=\tan^{-1}\alpha$ where $\alpha=2/\sqrt{3}[V_1/V_2-0.5]$ the series is of the form $$\beta=\tan^{-1}\alpha=a_1\alpha=a_3\alpha^3+a_5\alpha^5-a_7\alpha^7$$

where $a_1$, $a_3$, etc. are the series constants.

Once the value of $\beta$ is determined it is added to or subtracted from $K_n$ depending on which 30° sector the ratio $V_1/V_2$ is in.

From the foregoing discussion it can be seen that in order to compute $\theta$ for any shaft position, the apparatus of the invention must (1) demodulate the stator signals (2) compute $\beta=\tan^{11}\alpha$ where $\alpha=2/\sqrt{3}\,[V_1/V_2-0.5]$ and (3) compute $\theta=K_n\pm\beta$ where $K_n$=30°, 90°, 150°etc. depending upon the synchro shaft position.

Therefore, one of the objects of this invention is to provide a method and apparatus for converting multiple synchro inputs to a digital output, in a single operation, and at a fast conversion rate.

Another object is to provide a system capable of utilizing state-of-the-art microminiaturized solid state packaging.

DESCRIPTION OF THE DRAWINGS AND THE PREFERRED EMBODIMENT OF THE INVENTION

The before mentioned objects and other objects and advantages will become apparent from the following detailed description and accompanying drawings wherein.

Figures 2, 6:
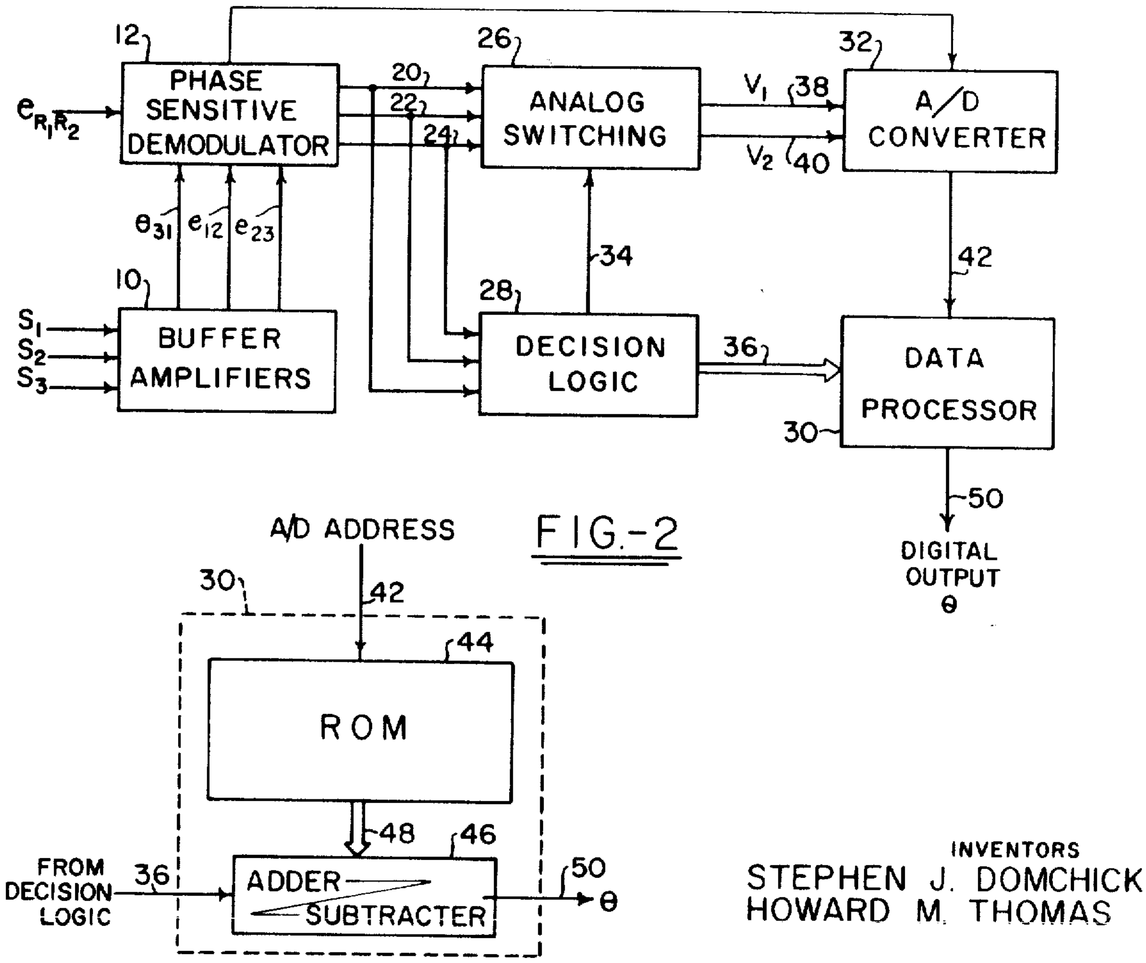
FIG. 2 is a block diagram representation of the apparatus of the invention.
FIG. 6 is a block diagram representation of the processor of FIG. 2.

With respect to Fig. 2, synchro stator signals $S_1$, $S_2$, $S_3$ are fed into buffer amplifiers 10. The buffer amplifiers isolate the system from the synchro, scale the stator voltages to a standard voltage level for system use, and derive the third stator signal $e_{12}$. The unit 10 is composed of three operational amplifiers $A_1$, $A_2$, and $A_3$ shown in FIG. 3 where $A_1$ and $A_2$ have adjustable loop gains used to scale the stator signals $e_{31}$ and $-e_{23}$, and $A_3$ is a differential amplifier which determines the difference between $e_{31}$ and $e_{23}$. This difference signal is the stator signal $e_{12}$.

Figure 3:
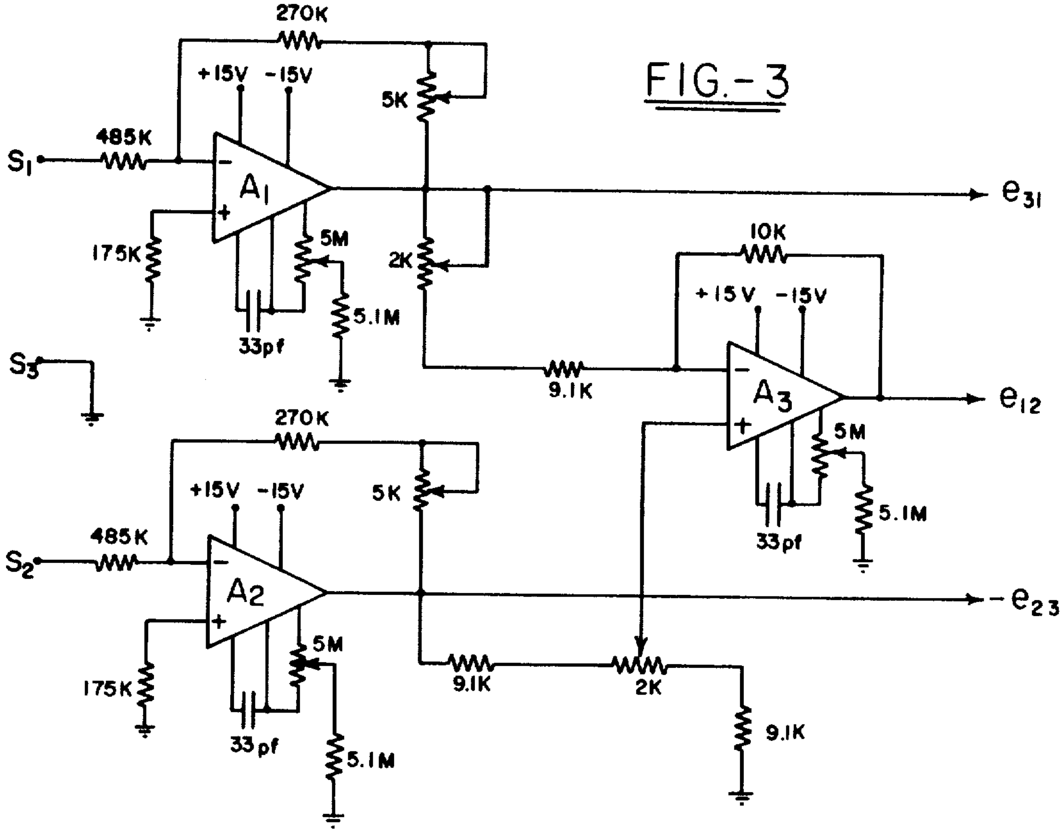
FIG. 3 is a circuit diagram of the buffer amplifiers of FIG. 2.

As shown in FIG. 3, the stator input $S_3$ is the reference and this is purely an arbitrary choice. A similar discussion would exist for either of the other two stator windings grounded.

The buffer unit 10 outputs the stator signals $e_{31}$, $-e_{23}$, and $e_{12}$ to a phase sensitive demodulator 12, which also accepts the synchro rotor excitation signal $e_{R1R2}$. The function of the unit 12 is to demodulate the stator voltages $e_{31}$, $-e_{23}$, and $e_{12}$ at their carrier peaks. This is illustrated in the simplified block diagram of FIG. 4 wherein a phase shift and signal shaping circuit 14 accepts the rotor excitation signal $e_{R1R2}$ and shifts its phase until its zero crossover coincides with the stator signal peaks. Due to a phase shift between the rotor and stator, this will be slightly less than 90°. The circuit 14 also shapes the rotor signal into substantially a square wave whose width may be varied to insure sampling of the stator signals at their carrier peaks. The square wave output of circuit 14 triggers a one shot 16 which in turn outputs a sample pulse to trigger a sample-and-hold circuit 18 and a delay circuit 17. The sample-and-hold circuit 18 tracks the stator signals on receipt of the sample pulse command and holds the signal magnitude until the sample pulse is removed and outputs on lines 20, 22, and 24 the demodulated stator signals $E_{31}$, $-E_{23}$, and $E_{12}$ respectively. The function of the delayed sample pulse from the delay circuit 17 will be described with reference to the A/D converter 32. The exact circuitry for the demodulator 12 is not illustrated because it is considered within the knowledge of persons skilled in the art; however, the waveforms associated with the units 14, 16, and 18 are illustrated in FIG. 5.

The demodulated or sampled signals $E_{31}$, $-E_{23}$, and $E_{12}$ are sent via lines 20, 22, and 24 to analog switching circuitry 26 and decision logic circuitry 28.

The decision logic circuitry 28 determines from the sampled stator voltages, which ones are to be used for $V_1$ and $V_2$. This information is required for computing $\beta$ where $\beta = \tan^{-1} 2/\sqrt{3}$ $[V_1/A'2-0.5]$.

The logic circuitry 28 also determines the value of $K_n$ and the sign of $\beta$ required for calculating $\theta$ since $\theta = K_n \pm \beta$ as herebefore discussed in regard to the theory of the invention.

Figure 1:
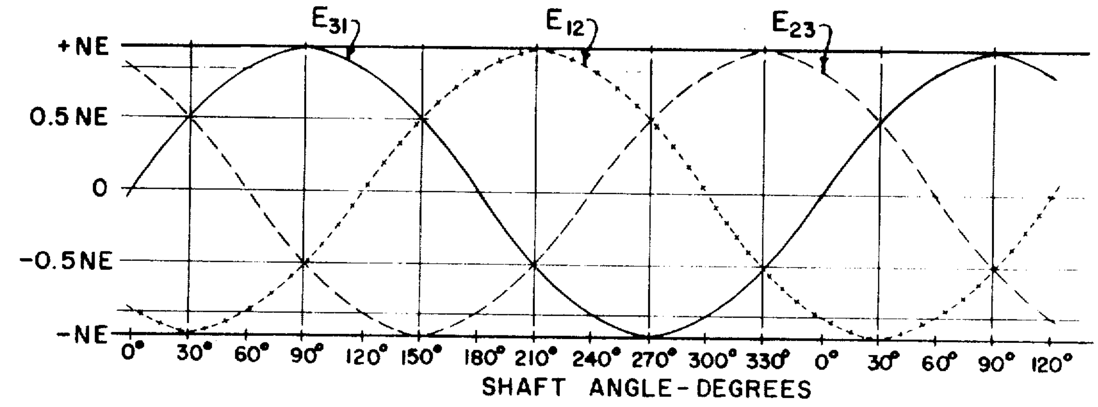
FIG. 1 is a plot of the demodulated synchro stator signals.

Various stator signal relationships exist in each of the 30° sectors. For example, the following relationships exist in the first three sectors according to table 1 and FIG. 1:

| | | |
|---|---|---|
| 0°–30° | $E_{31}>0$ | $E_{23}>E_{31}$ |
| 30°–60° | $E_{23}>0$ | $E_{31}>E_{23}$ |
| 60°–90° | $E_{23}>0$ | $E_{23}>E_{12}$ |

The signal relationships for the remaining sectors are determined and a sequence diagram made. The decision logic circuitry which performs the logic functions is not specifically shown or described because it is considered within the knowledge of persons skilled in the art to set up such a logic sequence and the circuitry to implement the logic decisions.

Control signals corresponding to the $V_1$ and $V_2$ selections made by the decision logic 28 are applied to the analog switching circuitry 26 via line 34. The sampled stator voltages $E_{31}$, $-E_{23}$, and $E_{12}$ are also applied to the switching circuit 26 wherein the absolute value of the $V_1$ signal selection made by the decision logic 28 is sent to an A/D converter 32 as the analog input 38 and the absolute value of the $V_2$ signal selection is sent to the A/D as the reference input 40. Absolute values are utilized to simplify the operation of the A/D.

The A/D 32 converts $V_1$ (in terms of $V_2$) to a digital number using a successive approximation technique. This technique is not new in the art and various types of apparatus are available to handle this function. For example, this invention uses a device manufactured by General Instrument Corporation of Hicksville, Long Island, N.Y. which is a monolithic integrated circuit containing 350 active components and performs all the logic and analog switching functions for 10-bit successive approximation analog-to-digital conversion.

Figure 4:
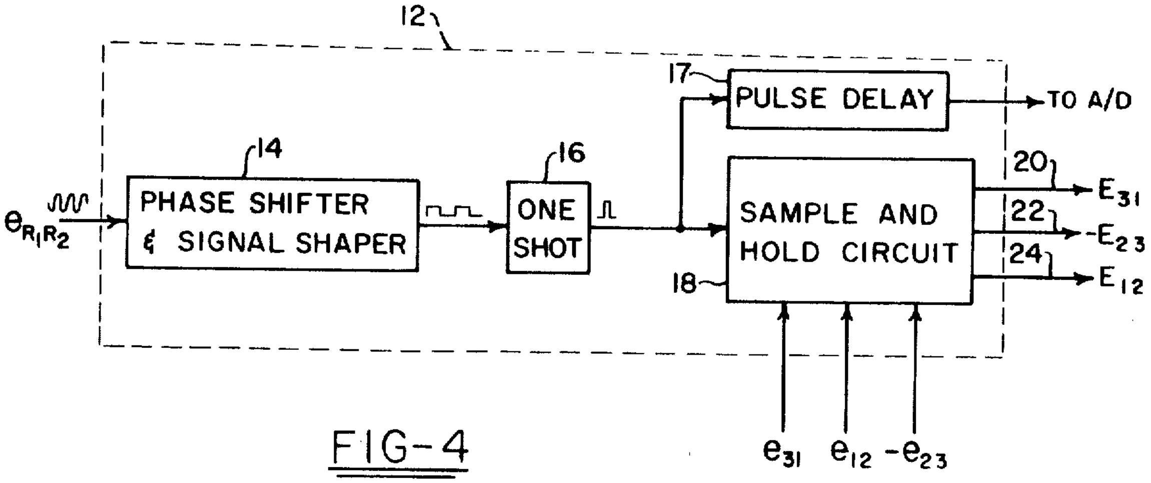
FIG. 4 is a block diagram representation of the demodulator of Fig. 2.
Figure 5:
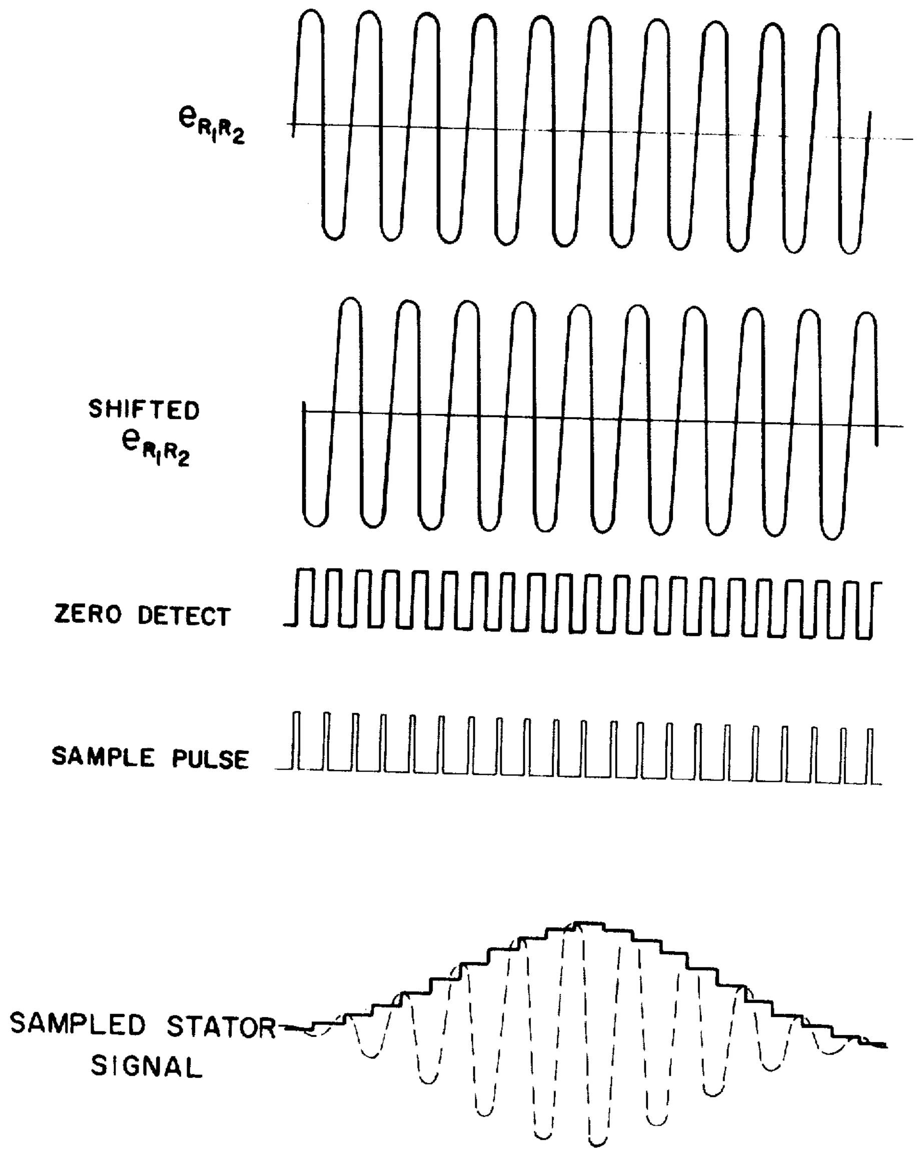
FIG. 5 shows the waveforms associated with the demodulator of FIG 2.

The A/D conversion process begins on receipt of a command pulse derived from the delay circuit 17 shown in FIG. 4. This command pulse is delayed at the A/D to permit completion of the sampling function in 18 and the $V_1$ and $V_2$ selection made by the logic 28.

The digital ratio $V_1/V_2$ is represented by 10 parallel bits in which the most significant bit (MSB) corresponds to one-half, the next MSB corresponds to one-fourth, the next MSB to one-eighth etc. in the manner of successive approximations. The ratio $V_1/V_2$ varies from 0.5 to 1.0 which means the MSB is always present. Therefore, at the A/D output 42 the MSB is dropped, effectively subtracting 0.5 from the binary number and therefore, $(V_1/V_2-0.5$ is determined in the conversion process by converting $V_1$ in terms of $V_2$ and dropping the MSB. The output 42 is sent to a digital processor 30 for the final calculation of $\theta$.

The function of the processor 30 is to output a digital $\theta$. This is accomplished by calculating $\theta = K_n \pm \beta$ from the value of $K_n$ and the sign of $\beta$ provided by the decision logic output 36, and from the value of $\beta$ provided by the A/D on its output 42.

The processor 30 may be one of several forms. It may be an arithmetic unit capable of performing multiplications and algebraic additions for the computation of the series approximation of $\beta$ and the computation of $\theta = K_n \pm \beta$. Units of this type are known in the art and may be adapted to this application, however, the preferred embodiment of this invention will be described utilizing a read-only memory (ROM) approach.

With reference to FIG. 6, the processor 30 incorporates a read-only-memory (ROM) 44 and a digital adder-substracter circuit 46 to implement the calculation of $\theta$. The ROM contains a store of the resultant calculations for the arctangent approximation of $\beta$. The output signal of the A/D 32 is used as an address to the ROM which outputs a digital word for $\beta$ in accordance with the address. Adder-subtracter 46 accepts the ROM output 48 and also the decision logic output 36 containing the $K_n$ value and sign of $\beta$ information. This completes the calculation of $\theta$ for $\theta = K_n \pm \beta$ and a signal 50 is outputted from the processor 30 indicative of the synchro shaft angular position in digital form.

The converter herebefore described is of a form applicable to solid state integrated circuit techniques and may be reduced to its equivalent form by persons knowledgeable in the art. Therefore, while one specific embodiment has been illustrated and described in detail, it is to be particularly understood that the invention is not limited thereto or thereby, but that the inventive scope is defined in the appended claims.

What is claimed is:

1. A synchro angle-to-digital converter for measuring the rotor-to-stator angular relationship comprising:
   a. first circuit means coupled to the synchro rotor signal and the stator signals to provide demodulated stator signal outputs;
   b. logic circuit means coupled to the first circuit means and accepting the demodulated stator signals to provide signal outputs on a first channel representative of a particular rotor-to-stator angular sector and on a second channel signals defining the sector;
   c. second circuit means coupled to and accepting the demodulated stator output to provide a unique pair of demodulated stator signals determined in accordance with the logic circuit means first channel output;
   d. analog-to-digital converter means coupled to the second circuit means output to provide a digital output signal representative of the voltage ratio of the demodulated stator signal pair; and e. digital processor means coupled to and accepting the outputs of the analog-to-digital converter means and the second channel of the logic circuit means to provide an output digital signal indicative of the synchro rotor-to-stator angular position.

2. The synchro angle-to-digital converter of claim 1 wherein the first circuit means comprises:
   a. an amplifier accepting the synchro stator signals to buffer the converter from the synchro and to scale the stator signals to a level suitable to the converter; and
   b. a phase sensitive demodulator accepting the rotor signal from the synchro and the scaled stator signals from the amplifier to provide demodulated stator signals at its output.

3. The synchro angle-to-digital converter of claim 2 wherein the phase sensitive demodulator comprises:
   a. a phase shift and signal shaping circuit accepting the synchro rotor signal to provide a substantially square wave output signal shifted in phase such that the signal zero crossover coincides with the stator signal peaks;
   b. a one-shot coupled to the output of the phase shift and signal shaping circuit to trigger a pulse at the stator signal peaks; and
   c. a sample-and-hold circuit coupled to and accepting the output pulse of the one shot to trigger tracking of the stator signals on the leasing edge of the pulse, holding of the stator signal levels during the pulse, and tracking cutoff on the trailing edge of the pulse.

4. The synchro angle-to-digital converter of claim 1 wherein the analog-to-digital converter means is a successive approximation-comparison converter outputting a digital signal representative of the ratio of two stator signals.

5. The synchro angle-to-digital converter of claim 1 wherein the digital processor comprises:

a. a read-only memory connected to accept the output signal of the analog-to-digital converter means as an address to a store of resultant calculations for the arctangent series to provide a digital signal output indicative of an angular position; and b. an adder/subtracter circuit connected to accept the outputs of the read-only memory and the logic circuit means second channel to algebraically combine said outputs.

6. A method of electronically converting the stator signals of a synchro to a digital equivalent indicative of the synchro rotor-to-stator angular position, said method comprising the steps of:

a. demodulating the synchro stator signals;

b. logically switching the demodulated signals to produce a first output pair indicative of a rotor-to-stator angular sector position, and a second output pair indicative of the sign and location of the sector;

c. converting the first output pair of signals to a digital equivalent representative of the ratio of two stator voltages and;

d. combining the second output signal pair with the converted first output pair to produce a digital signal indicative of the synchro rotor-to-stator angular position.

7. The method of claim 6 wherein demodulating of the stator signals is a sampling operation on the stator carrier peaks using the shifted rotor signal zero crossover as the stator signal peak reference.

8. The method of claim 6 wherein the combining of the signals is accomplished in a digital processor having a memory store of resultant calculations of angular rotor-to-stator position which is addressed by the converted first output signal, and an adder/subtracter to algebraically combine the memory store output and the second signal pair containing the sector location and sign information.

* * * * *

UNITED STATES PATENT OFFICE
CERTIFICATE OF CORRECTION

Patent No. 3,618,073 Dated November 2, 1971

Inventor(s) Stephen J. Domchick and Howard M. Thomas

It is certified that error appears in the above-identified patent and that said Letters Patent are hereby corrected as shown below:

Col. 1, line 54, after "$150^o$" add -- $210^o$ --.

Col. 1, in the table, under "$K_n$", "$30^o$th" should read -- $30^o$ --.

Col. 2, line 16, should read --

$$\beta = \tan^{-1} \alpha = a_1 \alpha - a_3 \alpha^3 + a_5 \alpha^5 - a_7 \alpha^7 \text{ --}$$

Col. 2, line 26, "$\beta = \tan^{11} \alpha$" should read -- $\beta = \tan^{-1} \alpha$ --.

Col. 4, line 43, after "accepting the" insert -- outputs of the first circuit means and the logic circuit means first channel --.

Signed and sealed this 6th day of June 1972.

(SEAL)
Attest:

EDWARD M.FLETCHER,JR.
Attesting Officer

ROBERT GOTTSCHALK
Commissioner of Patents